Patented Sept. 28, 1954

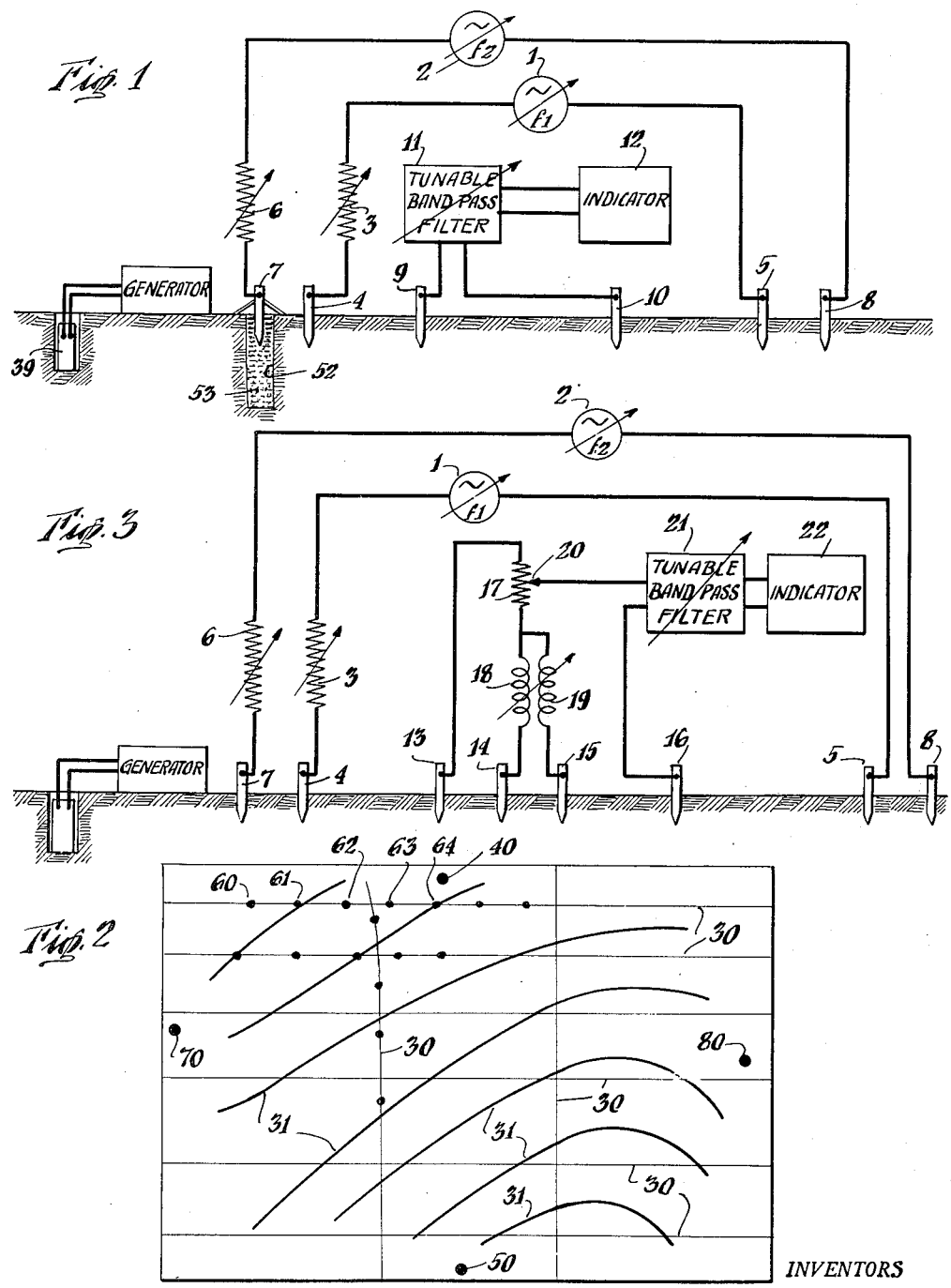

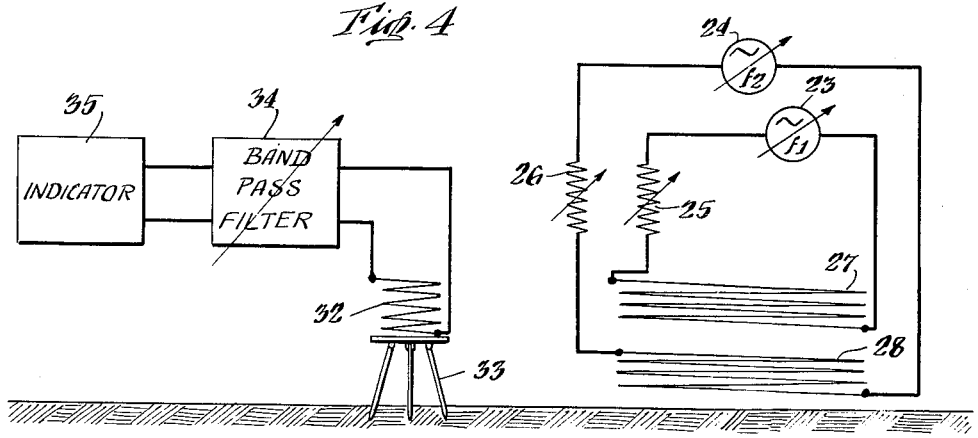
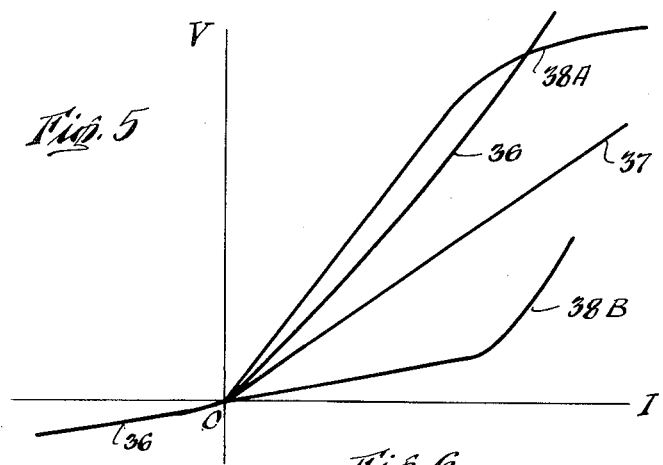
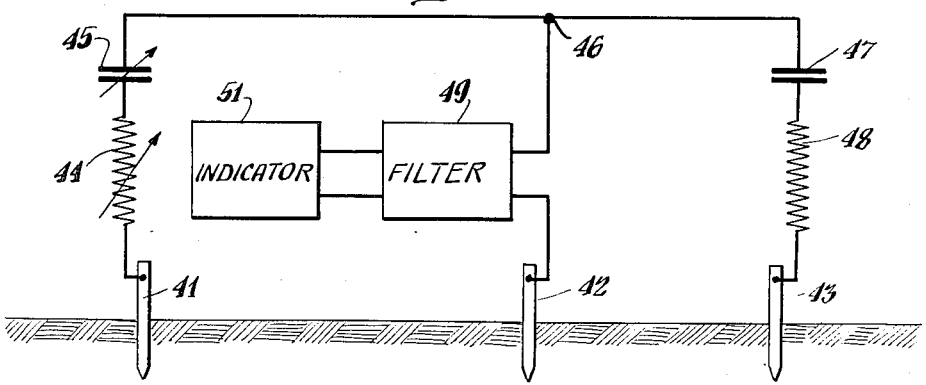

2,690,537

UNITED STATES PATENT OFFICE 2,690,537

ELECTRICAL METHOD AND APPARATUS FOR GEOLOGICAL EXPLORATION

Oscar Weiss, Dunkeld, Johannesburg, Union of South Africa, and Lucien Massé, Newark, N. J., assignors to Weiss Geophysical Corporation, New York, N. Y., a corporation of New York Application July 10, 1950, Serial No. 172,792

9 Claims. (Cl. 324—1)

This invention or discovery relates to a method of geological exploration and more particularly to a novel method of electrical prospecting for minerals.

In the potential method of electrical prospecting, an effort is made to measure an electrical characteristic of the earth, commonly termed apparent resistivity, by introduction of a current into the ground by means of two electrodes placed at spaced points in the earth and by measuring the potential difference created between the same or different points in the earth by the flow of said current through the earth. It is assumed that the apparent resistivity bears a definite relation to the resistivities of the geological formations in the earth and that it will supply, when suitably interpreted, definite information concerning the nature and the distribution of said geological formations in the earth. This method as usually practiced is subject to a number of limitations: (a) the use of point electrodes produces a concentration of current near the electrodes causing the inhomogeneities near the said electrodes to be emphasized tremendously; (b) variations in the rock formations tend to obscure the effect upon the apparent resistivity of the presence at depth of relatively good conductors such as concentrations of ore; (c) the top geological layers, frequently more conductive than the deeper layers, also tend to obscure the effect of deeper conductors such as ore. Other limitations could be recited but these will serve to illustrate the advantages of the present invention.

The present invention takes advantage of the well known fact that certain substances in suitable circumstances will allow electrical current to flow more easily in one direction than in the other. These substances are usually termed semi-conductors or rectifiers or detectors.

More precisely, if a current is made to flow through any conductor, there will appear between two given points a difference of potential or voltage, V, that will be a definite function of the current $i$. This function can be expanded in a McLaurin series in the following manner $$V = ai + bi^2 + ci^3 + di^4 \ldots$$

where $a$, $b$, $c$, $d$ are constants of the given conductor.

In most cases, the nature of the conductor and the total range of variation of the current are such that only the first term of the expansion need be retained. In this case, the contant $a$ symbolizes the resistance, usually written R, and the voltage becomes $$V = Ri$$

which is an expression of Ohm's law. Conductors, or, inversely, resistors that obey this law are called linear conductors or linear resistors.

When terms of the McLaurin expansion of higher order than the first must be retained to represent the voltage adequately, the conductor (or resistor) is said to be non-linear. However, it should be clearly understood that all resistors are non-linear when the current variations exceed a certain range characteristic of each. Also, all resistors can be assumed to be linear if the current variations are suitably restricted.

All non-linear resistors give rise to harmonics and modulation products when alternating currents are made to flow through them. To show how this happens, let it be assumed that the voltage V produced by the current $i$ is represented by $$V = ai + bi^2$$

limiting the expansion to the first two terms for simplicity of exposition.

Let it be further assumed that the total current is composed of two component currents of respective intensities $I_1$ and $I_2$ and frequencies $f_1$ and $f_2$. Then $$i = I_1 \cos \omega_1 t + I_2 \cos \omega_2 t$$

where $\omega_1 = 2\pi f_1$, and $\omega_2 = 2\pi f_2$. Substituting this in the expression for the voltage, it becomes, successively, $$V = a(I_1 \cos \omega_1 t + I_2 \cos \omega_2 t)$$
$$+ b(I_1 \cos \omega_1 t + I_2 \cos \omega_2 t)^2$$
$$V = aI_1 \cos \omega_1 t + aI_2 \cos \omega_2 t$$
$$+ bI_1^2 \cos \omega_1 t + bI_2^2 \cos 2\omega_2 t$$
$$+ 2bI_1 I_2 \cos \omega_1 t \cos \omega_2 t$$
$$V = \tfrac{1}{2}(bI_1^2 + bI_2^2) + aI_1 \cos \omega_1 t + aI_2 \cos \omega_2 t$$
$$+ \tfrac{1}{2}(bI_1^2 \cos 2\omega_1 t + bI_2^2 \cos 2\omega_2 t)$$
$$+ bI_1 I_2 [\cos (\omega_1 - \omega_2) t + \cos (\omega_1 + \omega_2) t]$$

In this case, the following results may be observed: (a) the original frequencies are present as they would be in the case of a linear resistor; (b) in addition there appears a constant potential; (c) there are also present second harmonics of the original frequencies; (d) finally there are two components having as respective frequencies, the sum and the difference of the original frequencies.

This example illustrates the origin of the frequencies resulting from the action of alternating currents of different frequencies on a non-linear conductor but it is not intended as a complete theoretical model. In the actual practice of the invention, currents of one or more frequencies may be applied to a conductor that requires more than two terms in the McLaurin expansion to adequately describe the generated voltage. Each additional term introduces new frequencies and modifies the amplitudes of the harmonics already existing.

However, where two frequencies are applied, a non-linear conductor (or resistor) always causes the appearance of the sum and difference of the applied frequencies. The sum and difference of the applied frequencies are usually called beat frequencies or side frequencies.

An object of the present invention is to provide a method and apparatus for detecting the presence of minerals having non-linear electrical conductive characteristics. A further object is to provide modifications of this method and apparatus which are suitable for general reconnaissance work. Another object is to provide modifications of this method and apparatus which are suitable for detailed studies.

A further object of the invention is to provide modifications of the method and apparatus whereby distinctions can be made between surface and depth effects.

A still further object of the invention is to provide modifications of the general method and apparatus whereby different minerals having non-linear conductive characteristics may be distinguished from one another.

A further object of the invention is to provide an improved electrode structure useful in the methods described herein for applying electric current to the ground.

The foregoing and other objects of the invention are accomplished, in the embodiments of the invention described in detail herein, by providing sources of electrical energy having two alternating components of different predetermined frequencies, and transmitting currents from said sources through a portion of the earth to be investigated. The potential existing at various points in said portion of the earth is then analyzed to detect any modulation or distortion such as would be characteristic of current flow through a mineral deposit having non-linear electrical characteristics.

When using the invention for reconnaissance work, the indicating apparatus used to detect the presence of a non-linear conductor may be such that it gives only a qualitative indication. When making a detailed survey, the detector apparatus should be more elaborate, so that it can measure variations in intensity and/or phase displacement. In such detailed surveys, the variations of such quantities along arbitrarily selected lines may be graphically represented. Also, the variations of such quantities may be plotted on a map of the area and points where the quantities are equal may be joined by lines so as to give an indication of the location and extent of the principal deposits of minerals having non-linear characteristics.

Conditions near the surface affect measurements made over a wide range of frequencies, whereas deeper lying deposits affect only measurements made at the lower frequencies.

Different minerals having different non-linear conductive characteristics are distinguished from each other by varying the operating point on the non-linear characteristics during measurement. This may be accomplished by varying the intensity of the current flow during a measurement of the modulation or distortion. One method of varying the current intensity is to introduce an additional direct current component into the ground. This variation of the total current intensity will further allow the current density at depth to be varied and therefore provides a method of controlling, to some extent, the depth investigated.

It is also sometimes desirable to vary the modulation or distortion effects by the application of shock waves during measurements.

Other objects and advantages of the invention will become apparent from consideration of the following specification and the accompanying drawings:

In the drawings,

Fig. 1 is a diagrammatic illustration of one form of apparatus which may be used to carry out the invention.

Fig. 2 illustrates a method of using the apparatus of Fig. 1 and a method of plotting data acquired in accordance with the invention.

Fig. 3 illustrates diagrammatically a modified form of apparatus for carrying out the invention.

Fig. 4 illustrates diagrammatically still another modified form of apparatus according to the invention.

Fig. 5 illustrates the non-linear electrical characteristics of certain minerals which may be detected by the present invention.

Fig. 6 illustrates a modified form of pickup apparatus.

Referring now to Fig. 1, there are shown at 1 and 2, two generators of alternating electrical energy. These generators may be of any suitable conventional type, such as oscillator circuits, motor driven generators, etc. They are preferably arranged so that the frequency of each may be varied independently of the frequency of the other.

The generator 1 is illustrated as being connected in a series circuit which includes a variable resistance 3, a pair of probes 4 and 5 which are inserted in electrically conductive relation to the ground, and the current flow path through the ground connecting the probes 4 and 5. The generator 2 is connected in a similar circuit including a variable resistance 6 and probes 7 and 8. The ground current flow paths of these two circuits have a common portion.

The probes 4 and 5 are illustrated in Fig. 1 as being in alignment with the probes 7 and 8. While such an arrangement may be used, it is not typical. The arrangement shown in Fig. 2, where the line joining probes 4 and 5 (located at 40 and 50) is substantially at right angles to the line joining probes 7 and 8 (located at 70 and 80), is more usual. However, any convenient arrangement of the probes 4 and 5 with respect to the probes 7 and 8 may be used, as long as the current flow paths between them have common portions.

It will be readily apparent to those skilled in the art that the current flow paths between the probes have no fixed lateral limits. Each current flow path has a wide cross-sectional area determined by the resistivities and impedances of the various earth components.

At spaced points along the common portion of the current flow paths, there are inserted two additional probes 9 and 10. These are connected to the input terminals of a tunable band pass filter 11, which in turn has its output terminals connected to an indicator 12. The indicator 12 may include an amplifier, and may be of any suitable conventional type. For example, it may be a simple earphone, a meter, a cathode ray oscilloscope, or a recording instrument.

The probes or electrodes used may be of any of the usual types employed in the art of geophysical prospecting. They may be used either on the surface or in drill holes. They may be used in pairs in the same drill hole, or in separate drill holes as conditions demand. Multiple arrays of drill holes may be used. As illustrated in the case of probe 7 in Fig. 1, the electrodes may be formed, in accordance with the invention, by filling a drill hole 52 with a conductive solution 53, and conveying the current through the solution. Any suitable solution may be used, for example, a solution of common salt in water. In any given set of measurements, either the energy supply electrodes may be fixed while the pickup electrodes are moved, or vice versa, or both may be moved.

When the current flowing between the energy supply electrodes passes through linear conductive material, it produces potential drops of the supply frequencies. However, the presence of any non-linear conductive material in the current flow path is immediately revealed by the appearance of harmonics and beat frequencies of the applied frequencies.

This phenomenon is independent of the resistivities of the rocks surrounding the conductive material. It is not required that the conductive material be massive in order to produce a measurable beat frequency potential difference. The variations of resistivity at or near the electrodes do not affect the results as in the case of conventional resistivity measurements. The distortion and modulation effects which are characteristic of non-linear conductors cannot be confused by other factors which interfere with correct resistivity measurements.

Fig. 2 represents a map of a portion of the earth's surface and illustrates methods of using the apparatus of Figs. 1 and 3. When using the apparatus of Fig. 1, the energy supply probes 4 and 5 are inserted at the points 40 and 50, and the probes 7 and 8 at the points 70 and 80. The pickup probes 9 and 10 are then inserted at spaced points such as 60, 61, 62 along arbitrarily selected lines 30 crossing the area under investigation.

The frequencies of the generators 1 and 2 are set to produce a desired sum or difference frequency. The filter 11 is then tuned to pass only that sum or difference frequency, and any response of the indicator is noted. Thus the filter may be tuned first to one and then the other of the sum and difference frequencies, to determine which one gives the greater response, and this one would then be used for the measurements.

Application Serial Number 237,184, filed July 17, 1951, as a continuation-in-part of the present application, describes an additional arrangement for rejecting the generator frequency components.

It has been found that low frequencies, for example, of the order of 100 cycles per second, or below, are affected by minerals which are relatively deep, while high frequencies, for example, of the order of 1000 cycles per second, or above, are affected only by conditions nearer the surface. This difference is due to the fact that absorption of the higher frequencies in the conducting earth increases with depth. Frequencies between these two ranges may sometimes be used to obtain more accurate measurement of phase displacement. It should be understood that the frequencies referred to in the foregoing examples are the beat frequencies (either sum or difference).

Suitable frequencies for the alternating signals from the generators 1 and 2 are 450 and 550 cycles per second, respectively. This combination of frequencies would produce the difference frequency of 100 cycles per second and the sum frequency of 1,000 cycles per second, referred to above.

Other suitable frequencies known in this art may alternatively be employed. For example, the generators may have frequencies of 80 and 100 cycles per second respectively. This combination would produce a difference frequency of 20 cycles per second and a sum frequency of 180 cycles per second.

Harmonics of each applied frequency will also be produced as a result of the non-linear electrical characteristics of minerals in the region.

When it is desired to make a detailed survey of an area, the apparatus of Fig. 1 may be modified as illustrated in Fig. 3. There the energy supply system is the same as in Fig. 1, but a different pickup apparatus is used. The pickup apparatus of Fig. 3 includes four pickup probes 13, 14, 15 and 16, and an alternating current potentiometer which comprises a slidewire resistance 17 and a coil 18 having a variable coupling with another coil 19. The potential drop appearing across probes 13 and 14 is impressed across resistance 17 and coil 18 in series. The potential drop appearing across probes 15 and 16 is impressed across the coil 19, that part of the resistance 17 between its lower end and the sliding contact 20, and the input terminals of a filter network 21. The output terminals of the filter network 21 are connected to an indicator 22, which may be of any suitable type.

A null method of balancing the potentiometer may be used. In other words, the contact 20 may be moved along resistance 17 to balance the "real" components of the two potential drops and the coupling between the coils 18 and 19 may be adjusted to balance the quadrature components, the adjustments being continued until the indicator reads zero. The final settings of the two adjustable elements, after suitable calibration, are then used to determine the relative magnitude and the phase displacement of the two potential differences.

When using the apparatus illustrated in Fig. 3 to make a detailed survey, the energy supply probes 4, 5, 7 and 8 are inserted at the locations 40, 50, 70 and 80 respectively, in Fig. 2, and the probes 13, 14, 15 and 16 are inserted respectively at the spaced points illustrated at 60, 61, 62 and 63. After the comparison of the potentials between 60—61 and 62—63 has been made, the pickup probes are then shifted to 61, 62, 63 and 64, respectively, and similar measurements are made at other points along each of the lines 30. A profile of potential variation along each line may then be drawn. Also, the points where equal values of either potential magnitude or phase shift are found may be connected by lines, as indicated at 31 in Fig. 2.

The arrangement of pickup electrodes illustrated in Fig. 3 and the method of using them just described may be varied in many different ways. For example, Fig. 6 illustrates a three electrode arrangement which may be used in place of the four electrode apparatus of Fig. 3. The arrangement and operation of Fig. 6 is described in detail at a later point in the specification. Many other arrangements of the pickup apparatus may be used. In using the apparatus, it is not necessary that the electrode spacing be held constant, as indicated in the method described above, but the spacing may be changed as required.

By increasing the separation of the energy supply electrodes, the current density at depth is increased. The effective depth of investigation may be thereby controlled. Another method of controlling the depth investigated is to vary the separation of the pickup electrodes. In that method also, increasing the electrode separation increases the effective depth of investigation.

Other common methods of measuring phase shift may readily be used in place of the one described. The phase shift measurements are particularly useful in determining the depth of mineral deposits.

Fig. 4 illustrates an alternative arrangement of apparatus, in which alternating currents supplied by generators 23 and 24 flow through respective circuits including variable resistances 25 and 26 and coils 27 and 28, which provide inductive coupling with the ground. The coils 27 and 28 are preferably laid out on the ground so as to encircle relatively large areas, but many other methods of mounting them may be used. When the coils are laid out on the ground, a coil 1000 ft. square would be considered a small coil and would represent approximately the minimum practical area to be encircled. Increasing the size of the energizing coils increases the depth of current penetration, so that the depth investigated may thereby be controlled to a certain extent. A suitable smaller coil 32, which may be mounted on a tripod 33, as shown, operates as a pickup. The tripod mounting permits orientation of the coil in three mutually perpendicular planes. The pickup coil 32 has its terminals connected through a variable band pass filter 34 to an indicator 35 of suitable type.

The inductive coupling type of apparatus illustrated in Fig. 4 is more suitable for rapid measurement, as in general reconnaissance work. Pickup coils such as 32 may be carried rapidly while measurements are being made. Any suitable mode of transportation may be used, such as a person, an animal, or a land, water or air vehicle, for example, an airplane or helicopter.

The apparatus of Fig. 4, using inductive coupling, measures an electromagnetic field which is indicative of the potential drop through the earth. In this application, reference to "measurement of the potential drop" is intended, unless otherwise indicated by the context, to be broad enough to include indirect measurements such as that of Fig. 4. Expressions such as "picking up quantities indicative of the flow of current" are used herein as being inclusive of sensing the flow of current either directly or indirectly, by measuring either electrical quantities or magnetic quantities, for example, by measuring potential differences, electric fields, currents, or magnetic fields.

The pickup system of Fig. 4, using a single coil, is especially useful for general reconnaissance work, and corresponds to the two-electrode pickup system of Fig. 1. In detailed survey work, two pickup coils would be more suitable, and they might be connected to correspond either with the three-electrode pickup system of Fig. 6 or with the four-electrode system of Fig. 2.

Conductive energy supply systems such as shown in Figs. 1 and 3, may be used with inductive pickup systems. Similarly, inductive energy supply systems may be used with conductive pickup systems.

Since many different minerals have non-linear electrical characteristics, it is desirable that some way be found to distinguish between non-linear characteristics produced by different minerals. This may be done by varying the operating point on the non-linear characteristics while the measurement is in progress. This operation may be more readily understood with reference to Fig. 5. Each electrically conductive material has a characteristic variation of potential drop with current flow through it, commonly termed its voltage-current (V-I) characteristic. A linear conductor has a characteristic which is straight, whereas non-linear conductors exhibit curved portions in their characteristics. Fig. 5 shows illustrative V-I characteristics of four different materials. Curve 37 is a linear characteristic and approximates the characteristic of copper. The curves 36, 38A and 38B illustrate typical V-I characteristics of non-linear conductors.

Many minerals, including the oxides and sulfides generally, have such non-linear characteristics. Galena and iron pyrites are familiar examples. Different minerals have distinctive non-linearities. In seeking a particular mineral by the use of the methods described above, it is essential that the current density used be such that the potential drop is measured on a curved portion of the V-I characteristic, or the modulation of the applied frequency will not be encountered. By changing the current flow, the operating point on the V-I characteristic is shifted. In that manner, an operating point on the curved portion of the characteristic may be found. In shifting the operating point, it may be particularly effective to utilize a direct current component in the applied electromotive force. That is, the applied electromotive force may be supplied from electrical source means adapted to supply both alternating current and a direct current of variable magnitude. A circuit comprising a direct current path from the source to the ground, terminating in probes, such as has been described herein, would be employed. In order to shift the operating point to a curved portion of the voltage-current characteristic, the direct current component is varied so as to obtain the greatest picked up signal, which will correspond to the condition when the operating point is in the region of the most curved portion of the characteristic. The resulting effect of obtaining a picked up signal of greater magnitude is quite advantageous in itself. Moreover, as mentioned earlier, in distinguishing one mineral from another it is helpful to be able to observe the relationship between the applied D. C. component and the magnitude of the picked up signal.

Where the term "modulation" is used in this application, it is intended, unless otherwise indicated by its context, to be broad enough to include not only the presence of sum or difference frequencies, but also to include those variations of an applied frequency which are characterized by the presence of harmonics, and are sometimes termed "distortion."

The current density through any particular particle of mineral in a field being investigated cannot, of course, be foretold, because of the large number of variables which influence it. Consequently, it is desirable to make potential drop measurements in a given field at several different values of applied current. The measurements at one current value may reveal the presence of minerals not shown by measurements at the other values. Furthermore, by comparisons of measurements at different current values, it is possible to gain some knowledge as to the probable nature of the minerals encountered.

Another variable to be considered when using the present invention is the variation due to changes in the size and pressure of the contact points on the surfaces of the mineral particles through which the current is transmitted. Changes in such contacts not only vary the contact resistance itself, but for any given mass of mineral, may also vary the operating point on the V-I characteristic by varying the current flow through the mass.

Minerals whose presence may not be otherwise detected may be located by using the methods described above and, during the measurements, subjecting the area under investigation to mechanical or electrical shock waves. Mechanical shock waves may be produced, for example, by means of explosives, as indicated at 39 in Fig. 1. Other methods of producing mechanical shock waves may alternatively be used. An electrical shock wave may be produced by a pulse of current. For this purpose, any electrical pulse source capable of producing a current pulse of high amplitude and short duration may be employed. These shock waves will cause variations in the contact resistance of the mineral particles and also may cause variations in the current density, as described above.

For the purpose of varying the current flow, each form of the apparatus according to the present invention is provided with a variable resistance in series with each generator as shown at 3 and 5 in Fig. 1. Any other suitable apparatus for varying the current flow may alternatively be used. In view of the desirability of varying the current flow, apparatus constructed in accordance with the present invention should be capable of producing a wide range of current flows. For example, each generator may be capable of producing a flow of up to 25 amperes at 1000 volts. When high currents are used, it may be desirable to modify the form of the current supply electrodes to increase their current carrying capacity. Sheet electrodes, rather than simple probes, may be used.

While in the illustrated examples, a current having two alternating components of different frequencies has been used, it is sufficient in some cases to use a single alternating current, depending upon the non-linear characteristics of the particular mineral being sought. In this case, the distortion of the wave, rather than its modulation, is investigated. It will be understood that if a signal including only a single frequency component is applied to a portion of the earth including a mineral deposit having a non-linear characteristic, the resulting current flowing through that portion of the earth will not be a sine wave. The resulting current can be analyzed into a plurality of sine waves, and thus there are produced in the earth, as a result of the non-linear characteristic, new frequencies not present in the applied signal. These new frequencies will comprise harmonics or integral multiples of the original frequency. The principles underlying the production of new frequencies by non-linear impedances are explained in textbooks on electronics, for example, Communication Engineering by W. L. Everitt, 2nd edition, 1937, page 24. It will be understood that in the embodiments of the present invention where only one alternating component is applied, instead of two, one would merely omit the application of the second component. That is, in Fig. 1, one would omit one of the generators 1 or 2, and its associated probes and connections thereto.

In some cases, it may be desirable to hold the frequency of one source fixed and vary the frequency of the other over a predetermined band. In those cases, the indicating apparatus should include a wave analyzer or a cathode ray oscilloscope to measure the frequency intensity characteristics. Such an oscilloscope may, if desired, be provided with photographic recording equipment.

Fig. 6 illustrates a modified form of pickup apparatus, which may be used in place of that of Fig. 3, and which requires only three pickup probes 41, 42 and 43. A variable resistance 44 and a variable condenser 45 are connected between probe 41 and a junction 46, and form one arm of a bridge circuit. Another arm of the bridge is connected between junction 46 and probe 43, and includes a condenser 47 and a resistance 48. The other two arms of the bridge are formed by the ground paths between probes 41—42 and 42—43, respectively. The junction 46 and probe 42 form the output terminals of the bridge, and are connected through a filter 49 to an indicator 51.

Operation of the pickup apparatus of Fig. 6 is similar to that of Fig. 2. The three probes 41, 42, 43 are inserted, for example, at points 60, 61 and 62 of Fig. 3. The condenser 45 and resistance 44 are then adjusted until indicator 51 reads zero. The final settings of the adjustable elements enable a comparison of the magnitudes and phase displacements of the potential drop between 60—61 with the corresponding characteristics of the potential drop between 61—62.

Where the area being investigated is in the vicinity of a power line, the current induced in the ground by the power line may be utilized as one of the component frequency currents in carrying out the present invention.

While certain preferred embodiments of the invention have been shown and described herein, many equivalent modifications thereof will readily occur to one skilled in the art, and it is therefore intended that the invention be limited only by the terms of the appended claims.

We claim:

1. A method of geophysical exploration comprising the steps of generating an electromotive force having two substantial components of different frequencies, applying said electromotive force to a portion of the earth to be investigated including minerals having non-linear electrical characteristics, thereby producing in said portion of the earth signals including side-frequency components derived from those of said applied frequency components, simultaneously detecting the resulting signals at pairs of points along a line crossing said portion of the earth, rejecting all said detected signals except a remaining one of said side-frequency components, measuring the difference in phase of said one remaining side-frequency component as detected at one of said pairs of points as compared with its phase as detected at a second of said pairs of points, and similarly measuring the phase difference at other pairs of points along said line so as to measure its shift in phase as a function of position along said line.

2. A method of locating mineral deposits having non-linear electrical conductive characteristics, comprising the steps of applying a sinusoidal electrical signal to a portion of the earth to be investigated, so as to produce current flow therethrough and through any said mineral deposits therein having non-linear electrical characteristics, thereby producing resulting signals including new frequency components absent from the applied signal, detecting the resulting signals at pairs of points simultaneously along a line crossing said portion of the earth, rejecting all said detected signals except a remaining one of said new frequency components, measuring the difference in phase of said one remaining frequency component as detected at one of said pairs of points as compared with its phase as detected at a second of said pairs of points, and similarly measuring the phase difference at other pairs of points along said line so as to measure the shift in phase of said remaining component as a function of position along said line.

3. The method of locating mineral deposits having non-linear voltage-current characteristics, comprising the steps of applying an alternating electrical signal having two substantial components of different frequencies to a portion of the earth to be investigated, so as to produce current flows therethrough and through any said mineral deposits therein having non-linear electrical characteristics, thereby producing in said portion of the earth resulting signals including side-frequency components derived from said applied components, picking up said resulting signals in said portion of the earth, filtering out of said picked up signals all frequency components except one remaining side-frequency component derived from said applied components, measuring said remaining side-frequency component, setting off an explosion in a region near that portion of the earth where said quantities are being picked up, so as to apply a pulse of seismic energy of high amplitude but short duration to the portion of the earth near where said signals are being picked up, while simultaneously measuring said remaining side-frequency component, and detecting the effect of said pulse of energy on the measured value of said remaining side-frequency component.

4. The method of locating mineral deposits having non-linear voltage-current characteristics, comprising the steps of applying an alternating electrical signal having two substantial components of different frequencies to a portion of the earth to be investigated, so as to produce current flows therethrough and through any said mineral deposits therein having non-linear electrical characteristics, thereby producing in said portion of the earth resulting signals including side-frequency components derived from said applied components, picking up said resulting signals in said portion of the earth, filtering out of said picked up signals all frequency components except one remaining side-frequency component derived from said applied components, measuring said remaining side-frequency component, applying a pulse of energy of high amplitude but short duration to the portion of the earth near where said signals are being picked up, while simultaneously measuring said remaining side-frequency component, and detecting the effect of said pulse of energy on the measured value of said remaining side-frequency component.

5. The method of locating mineral deposits having non-linear voltage-current characteristics, comprising the steps of applying an alternating electrical signal having two substantial components of different frequencies to a portion of the earth to be investigated, so as to produce current flows therethrough and through any said mineral deposits therein having non-linear electrical characteristics, thereby producing in said portion of the earth resulting signals including side-frequency components derived from said applied components, picking up said resulting signals in said portion of the earth, filtering out of said picked up signals all frequency components except one remaining side-frequency component derived from said applied components, measuring said remaining side-frequency component, applying a pulse of electrical energy of high amplitude but short duration to the portion of the earth near where said signals are being picked up, while simultaneously measuring said remaining side-frequency component, and detecting the effect of said pulse of energy on the measured value of said remaining side-frequency component.

6. A method of locating mineral deposits having non-linear electrical conductive characteristics, comprising the steps of applying an alternating electrical signal to a portion of the earth to be investigated, so as to produce current flow therethrough and through any said mineral deposits therein having non-linear electrical characteristics, thereby producing in said portion of the earth resulting signals including new frequency components absent from the applied signal, picking up said signals at points in said portion of the earth, measuring the amplitude of a remaining one of said new components while simultaneously applying a pulse of energy of high amplitude but short duration to a portion of the earth near where said signals are being picked up, so as to change at least momentarily the contact impedance of said mineral deposits, and detecting the effect of said pulse of energy on the measured amplitude of said remaining new component.

7. A method of locating mineral deposits having non-linear voltage-current characteristics, comprising applying to a portion of the earth to be investigated electrical signals comprising a sinusoidal alternating component and a direct current component, so as to produce current flow therethrough and through any said mineral deposits therein having non-linear electrical characteristics, whereby said non-linear characteristics of said mineral deposits produce, in said current, new frequency components derived from said applied alternating component, picking up signals indicative of the flow of said current along a plurality of lines crossing said portion, filtering out of said picked up signals all frequency components except one of said new components, progressively varying said direct current component so as progressively to shift the operating point on said non-linear voltage-current characteristic while simultaneously measuring said remaining new component, and detecting the effect of said variation of direct current on the measured value of said remaining new component.

8. A method of locating mineral deposits having non-linear voltage-current characteristics, comprising the steps of applying to a portion of the earth to be investigated electrical signals including two sinusoidal components of different frequencies and a direct current component, so as to produce current flow therethrough, and through any said mineral deposits therein having non-linear electrical characteristics, whereby said non-linear characteristics of said mineral deposits produce, in said current, new frequency components derived from said applied frequency components, picking up the resulting signals at points along a plurality of lines crossing said portion, filtering out of said picked up signals all frequency components except a remaining one of said new frequency components, measuring said remaining new component, progressively varying said direct current component so as progressively to shift the operating point on said non-linear voltage-current characteristic while simultaneously measuring said remaining new component, and detecting the effect of said variation on the measured value of said remaining new component.

9. In apparatus for geophysical exploration of the type including means for applying an alternating electrical signal to a region of the earth including mineral deposits having non-linear electrical characteristics so as to produce signals including new frequency components absent from the applied signal, in combination, three probes adapted to be inserted into the ground simultaneously at three spaced points along a line crossing said region, a circuit including impedance means connecting a first exterior one of said probes to a junction point, a circuit including variable impedance means comprising resistance and reactance connecting a second exterior one of said probes to said junction point, circuit means connecting the intermediate, third one of said probes and said junction point to the input terminals of a filter adapted to pass only one of said new frequency components, and an indicator device connected to the output terminals of said filter, whereby said variable impedance means may be adjusted until said indicator device gives a null reading, thereby providing means for measuring the phase relationship of said new frequency component between said intermediate probe and the first of said exterior probes, on the one hand, compared to that between said intermediate probe and the second of said exterior probes on the other.

References Cited in the file of this patent

UNITED STATES PATENTS

| Number | Name | Date |
|---|---|---|
| 736,411 | Leonard | Aug. 18, 1903 |
| 1,660,774 | Vos et al. | Feb. 28, 1928 |
| 1,748,659 | Sundberg | Feb. 25, 1930 |
| 1,803,405 | Ricker | May 5, 1931 |
| 1,812,392 | Zuschlag | June 30, 1931 |
| 1,842,361 | Nichols | Jan. 19, 1932 |
| 1,843,407 | Sundberg | Feb. 2, 1932 |
| 1,884,496 | Zuschlag | Oct. 25, 1932 |
| 1,911,137 | Blau | May 23, 1933 |
| 1,938,535 | Peters | Dec. 5, 1933 |
| 2,104,440 | Stratham | Jan. 4, 1938 |
| 2,139,460 | Potapenko | Dec. 6, 1938 |
| 2,192,404 | Jakosky | Mar. 5, 1940 |
| 2,220,788 | Lohman | Nov. 5, 1940 |
| 2,230,502 | Pearson | Feb. 4, 1941 |
| 2,239,466 | Newfeld | Apr. 22, 1941 |
| 2,264,318 | Lee | Dec. 2, 1941 |
| 2,271,951 | Pearson | Feb. 3, 1942 |
| 2,276,974 | Howard | Mar. 17, 1942 |
| 2,342,626 | Evjen | Feb. 29, 1944 |
| 2,354,535 | Muffly | July 25, 1944 |
| 2,364,159 | Muffly | Dec. 5, 1944 |
| 2,370,814 | Riise | Mar. 6, 1945 |
| 2,408,029 | Bazzoni | Sept. 24, 1946 |
| 2,440,693 | Lee | May 4, 1948 |
| 2,527,559 | Lindblad | Oct. 31, 1950 |
| 2,542,462 | Beard | Feb. 20, 1951 |
| 2,575,349 | Lee | Nov. 20, 1951 |